United States Patent [19]

Nisley

[11] Patent Number: 5,536,090
[45] Date of Patent: Jul. 16, 1996

[54] EXPANSION BEARING HAVING IMPROVED LUBRICATION ARRANGEMENT

[75] Inventor: Donald L. Nisley, Greenville, S.C.

[73] Assignee: Reliance Electric Industrial Company, Greenville, S.C.

[21] Appl. No.: 405,132

[22] Filed: Mar. 15, 1995

[51] Int. Cl.$^6$ .................................... F16C 33/66
[52] U.S. Cl. .................. 384/474; 384/475; 384/477; 384/498; 384/537; 384/906
[58] Field of Search .................. 384/474, 475, 384/477, 498, 537, 906

[56] References Cited

U.S. PATENT DOCUMENTS

| | | |
|---|---|---|
| 3,188,154 | 6/1965 | Firth . |
| 3,325,175 | 6/1967 | Lower . |
| 3,497,274 | 2/1970 | Yardley . |
| 3,499,654 | 3/1970 | Lower . |
| 3,518,962 | 7/1970 | DeLeu et al. . |
| 3,806,210 | 4/1974 | DeLeu . |
| 3,810,636 | 5/1974 | Gorski . |
| 3,934,953 | 1/1976 | Tooley . |
| 3,957,319 | 5/1976 | Gorski . |
| 4,348,067 | 9/1982 | Tooley . |
| 4,411,437 | 10/1983 | Conti . |
| 4,531,845 | 7/1985 | Heshmat . |
| 4,575,265 | 3/1986 | Tooley . |
| 4,671,681 | 6/1987 | LaRou .................... 384/906 |
| 4,674,894 | 6/1987 | Heshmat . |
| 4,687,351 | 8/1987 | Martinie . |
| 4,728,202 | 3/1988 | LaRou . |
| 4,763,904 | 8/1988 | Martinie . |
| 4,765,760 | 8/1988 | Heshmat . |
| 4,776,709 | 10/1988 | Tooley . |
| 4,832,511 | 5/1989 | Nisley . |
| 4,863,291 | 9/1989 | Heshmat . |
| 4,906,111 | 3/1990 | Martinie . |
| 4,928,795 | 5/1990 | Maloney . |
| 4,973,172 | 11/1990 | Nisley . |
| 5,028,151 | 7/1991 | Nisley . |
| 5,074,040 | 12/1991 | Nisley . |
| 5,107,589 | 4/1992 | Nisley . |
| 5,373,636 | 12/1994 | Martinie . |

OTHER PUBLICATIONS

SealMaster Catalog, "Textile Bearing Pillow Blocks Series TXP and ETXP," p. 39, 1988.
FAFNIR Catalog, "RAKHL Expansion Series," 1988.
FAFNIR Catalog, "RAKHL Expansion Serial," 1988.
FAFNIR Catalog "Single Pillow Blocks – Expansion Series RAKHL/LAKHL Types," p. 95, 1966.
SealMaster Catalog, "Gold Line with Skwezloc, The Ultimate in Shaft Locking Devices," p. 8, 1988.

Primary Examiner—Lenard A. Footland
Attorney, Agent, or Firm—Dority & Manning

[57] ABSTRACT

A bearing assembly having an improved lubrication arrangement includes an inner ring and an outer ring assembly defining a bearing chamber within which bearing elements are disposed. The inner ring, outer ring assembly and bearing elements comprise a bearing group. A housing is disposed about and positionally secures the bearing group. A first lubrication path is defined by the outer ring assembly to conduct lubricant to the bearing chamber. A second lubrication path is defined by the housing to conduct lubricant to the first lubrication path. Preferably, a threaded fitting extends through the second lubrication path and is threadably secured to the first lubrication path so that lubricant may be conducted directly into the first lubrication path without leakage between the bearing group and the housing.

29 Claims, 6 Drawing Sheets

5,536,090

EXPANSION BEARING HAVING IMPROVED LUBRICATION ARRANGEMENT

BACKGROUND OF THE INVENTION

The present invention generally concerns bearing assemblies. More particularly, the invention relates to a bearing assembly having an improved lubrication system to prevent lubricant loss between a bearing chamber and a bearing housing.

Bearing assemblies are typically designed having an inner and an outer ring, each defining an annular raceway situated in opposition to one another. Bearing elements are disposed in a bearing chamber defined between the opposed raceways, thereby permitting the rotational displacement of the inner and outer rings with respect to one another. To facilitate this relative rotation, such bearing assemblies are generally configured so that a lubricant may occasionally be conducted to the bearing chamber.

In a typical configuration, the inner and outer rings are secured within a housing. As such, the lubricant must be introduced into the bearing assembly from an external point through or around the housing. The lubricant travels to the bearing chamber by way of a lubrication path defined within the bearing group, which may comprise the inner and outer rings, the bearing elements, seals and other related elements generally secured by or within the housing. One general bearing construction also defines a second lubrication path extending through the housing to the first lubrication path. This second path allows lubricant to be conducted under pressure into the first lubrication path from a lubricant source.

A difficulty may often be encountered if such an arrangement is employed in, for example, an expansion bearing. In an expansion bearing, the clearance between the housing and the bearing group is sufficient to permit the bearing group to slide axially with respect to the housing. This axial movement may be desirable if relatively small axial shifts in shaft position are expected during operation. The looseness of the expansion bearing design, however, may allow lubricant to excessively leak from the bearing assembly during use. Specifically, contaminants within the bearing chamber or the first lubrication path may hinder lubricant flow, thus forcing lubricant through the clearance between the housing and the bearing group.

Often, an expansion pillow block bearing assembly includes an outer ring assembly comprising an outer ring and an aligning ring. The outer ring defines the outer raceway while the aligning ring positions the outer ring with respect to the housing. The aligning ring usually has an axially curved inner surface to receive a complementary outer surface of the outer ring. The aligning ring's outer surface is typically cylindrical to permit the aligning ring to move axially as described above.

The curved fit between the aligning ring and the outer ring is a tight fit that allows slight angular adjustments which may be necessary to compensate for angular misalignment of the shaft. The slip fit between the aligning ring and the housing permits relatively greater movement of the aligning ring relative to the housing than is permitted by the fit between the outer ring and the aligning ring. The aligning ring thus secures the bearing group while permitting some desirable axial movement.

In such a configuration, the first and second lubrication paths may respectfully define passageways through the aligning and outer rings and through the housing. Thus, the meeting of these passageways is at the slip fit between the aligning ring and the housing. Because of the relatively large clearance of this slip fit, however, lubricant conducted under pressure into the housing passageway may tend to leak between the aligning ring and the housing, particularly when contaminants in the bearing group or the bearing chamber impede lubricant flow.

One solution to this problem utilizes housing seals to reduce leaks from between the housing and the bearing group. Such housing seals may extend between the housing and the inner ring, defining a cavity open to the bearing chamber into which lubricant may be conducted. Often, however, seals do not adequately prevent leaks between the aligning ring and the housing. Additionally, the seals may themselves leak due to the relatively light contact between the seals and rotating elements of the bearing.

SUMMARY OF THE INVENTION

The present invention recognizes and addresses the foregoing disadvantages, and others, of prior art constructions and methods.

Accordingly, it is an object of the present invention to provide a bearing assembly having an improved lubrication arrangement.

It is a more particular object of the present invention to provide a bearing assembly having an improved lubrication arrangement which substantially reduces loss of lubricant prior to reaching the bearing chamber.

It is another object of the present invention to provide an expansion bearing assembly having an improved lubrication arrangement such that lubricant conducted therethrough is not lost between the housing and the bearing group.

One or more of these objects are accomplished by an improved bearing assembly including an inner ring defining a first annular raceway surface and an outer ring assembly defining a second annular raceway surface, wherein the first and second annular raceway surfaces are situated opposite to one another. The inner ring and outer ring assembly define a bearing chamber within which at least one bearing element may be disposed such that the inner ring and outer ring assembly may be displaced relative to one another. Typically, the inner ring is secured to a shaft and rotates therewith, while the outer ring assembly remains generally rotationally stationary with respect to the housing.

The inner ring and outer ring assembly and the bearing elements comprise a bearing group. A portion of the bearing group defines a first lubrication path to the bearing chamber. Preferably, the first lubrication path includes a passageway through the outer ring assembly to the bearing chamber. Lubricant conducted through the first lubrication path enters the bearing chamber to lubricate the bearing elements and the annular raceway surfaces.

The lubricant may exit the bearing chamber through a lubrication exit path. In such embodiments, the lubrication exit path may be defined by deformation of a seal assembly if lubricant pressure exceeds a predetermined threshold. The seal assembly thus prevents the escape of lubricant from the bearing chamber until excess lubricant in the bearing chamber causes sufficient pressure to permit such escape.

A housing is disposed about, and positionally secures, the bearing group. It furthermore defines a second lubrication path through the housing to the first lubrication path.

A fitting assembly comprising a fitting and a washer conducts lubricant through the second lubrication path and into the first lubrication path. Preferably, the fitting is threaded and may also be tapered so that it may be screwed into the first lubrication path to form a mechanical seal. Lubricant conducted through the fitting is thereby prevented from escaping from the first lubrication path back into the second lubrication path or between the bearing group and the housing.

Lubricant conducted under pressure through the fitting thus creates a generally one-way lubricant flow through the first lubrication path, into the bearing chamber, and out the lubrication exit path. This unidirectional flow tends to expel contaminants from the first lubrication path and the bearing chamber, thereby tending to prevent contaminant buildup therein. Such buildup of contaminants might otherwise impede the flow of lubricant through the bearing assembly and cause leakage of lubricant from between the bearing group and the housing. According to the present invention, however, these contaminants are generally either overcome or flushed from the bearing assembly. Accordingly, the possibility of a total lubricant blockage is thereby reduced.

In a preferred embodiment, the outer ring assembly comprises an aligning ring disposed radially outward of the outer ring to positionally secure the outer ring and to position the bearing group with respect to the housing. Additionally, the aligning ring is configured to slide axially with respect to the housing, thus permitting the bearing assembly to operate as an expansion bearing as is understood in the art. In this embodiment, the first lubrication path comprises a passageway defined through the aligning ring and a passageway defined through the outer ring to the bearing chamber. The fitting thus forms a mechanical seal with the aligning ring.

Furthermore, the fitting attached to the aligning ring serves as an anti-rotation device. As is known in the art, an element may extend through the housing and into an outer ring assembly to resist unwanted rotation thereof. In a preferred embodiment of the present invention, the second lubrication path comprises a slot having a transverse width approximating the fitting's width. When attached to the aligning ring, the fitting thus resists such unwanted rotation, thereby obviating the need for a separate anti-rotation pin to the aligning ring. In an expansion bearing configuration, the slot has an axial width greater than the fitting's width to allow the fitting's axial movement in conjunction with the aligning ring's movement.

Other objects, features, and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
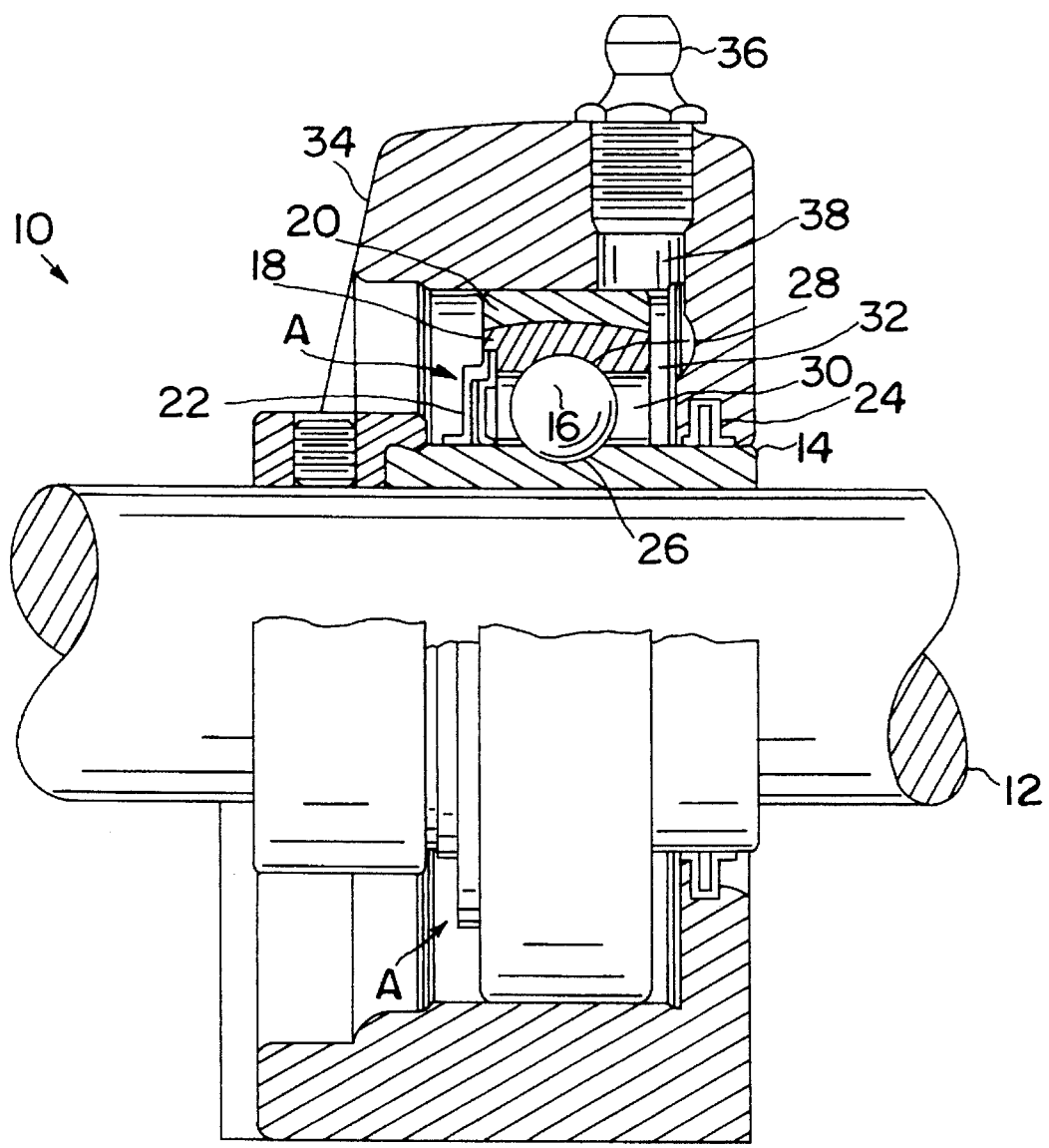
FIG. 1 is a partial cross-sectional view illustrating a prior art expansion bearing having a lubrication path to a bearing chamber therein.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

As generally described above, typical pillow block expansion bearings define a lubrication path through a bearing housing and to a bearing chamber within which bearing elements are situated. Referring to FIG. 1, a prior art expansion bearing 10 is illustrated operatively connected to a shaft 12. Bearing 10 includes a bearing group, indicated generally at A, comprising an inner ring 14, bearing elements 16, outer ring 18, aligning ring 20, and seals 22 and 24. Inner ring 14 and outer ring 18 define annular raceways 26 and 28, respectively, which secure and guide bearing elements 16. Inner ring 14 and outer ring 18 further define a bearing chamber 30 axially bounded on one side by seal 22 and on the other side by a first lubrication path 32.

As will be understood by those of ordinary skill in the art, the fit between aligning ring 20 and outer ring 18 is a microscopic interference fit that permits some angular displacement of outer ring 18 to compensate for slight angular misalignment of shaft 12. Specifically, angular misalignment of shaft 12 may cause angular displacement of inner ring 14, bearing elements 16 and outer ring 18 with respect to aligning ring 20. The curved inner surface of aligning ring 20 permits such displacement without dislocating aligning ring 20. The slip fit between aligning ring 20 and housing 34 permits some axial movement of aligning ring 20 with respect to housing 34. Thus, expansion bearing 10 accommodates both the angular misalignment of shaft 12 and axial displacement of shaft 12 due to, for example, ambient temperature changes.

In this prior art design, lubricant is conducted to bearing chamber 30 through grease fitting 36 via second lubrication path 38 and first lubrication path 32. Based on the discussion above, it will be appreciated that leakage paths exist between housing 34 and aligning ring 20 as well as between inner ring 14 and seal 24.

In other prior art designs, a first lubrication path is defined through the aligning ring and the outer ring. A fitting extends through the housing and into the first lubrication path in the aligning ring. Thus, the fitting may bound axial movement of the aligning ring with respect to the housing. While this design permits insertion of grease directly into the first lubrication path, a leakage path still exists between the aligning ring and the housing.

Figure 2:
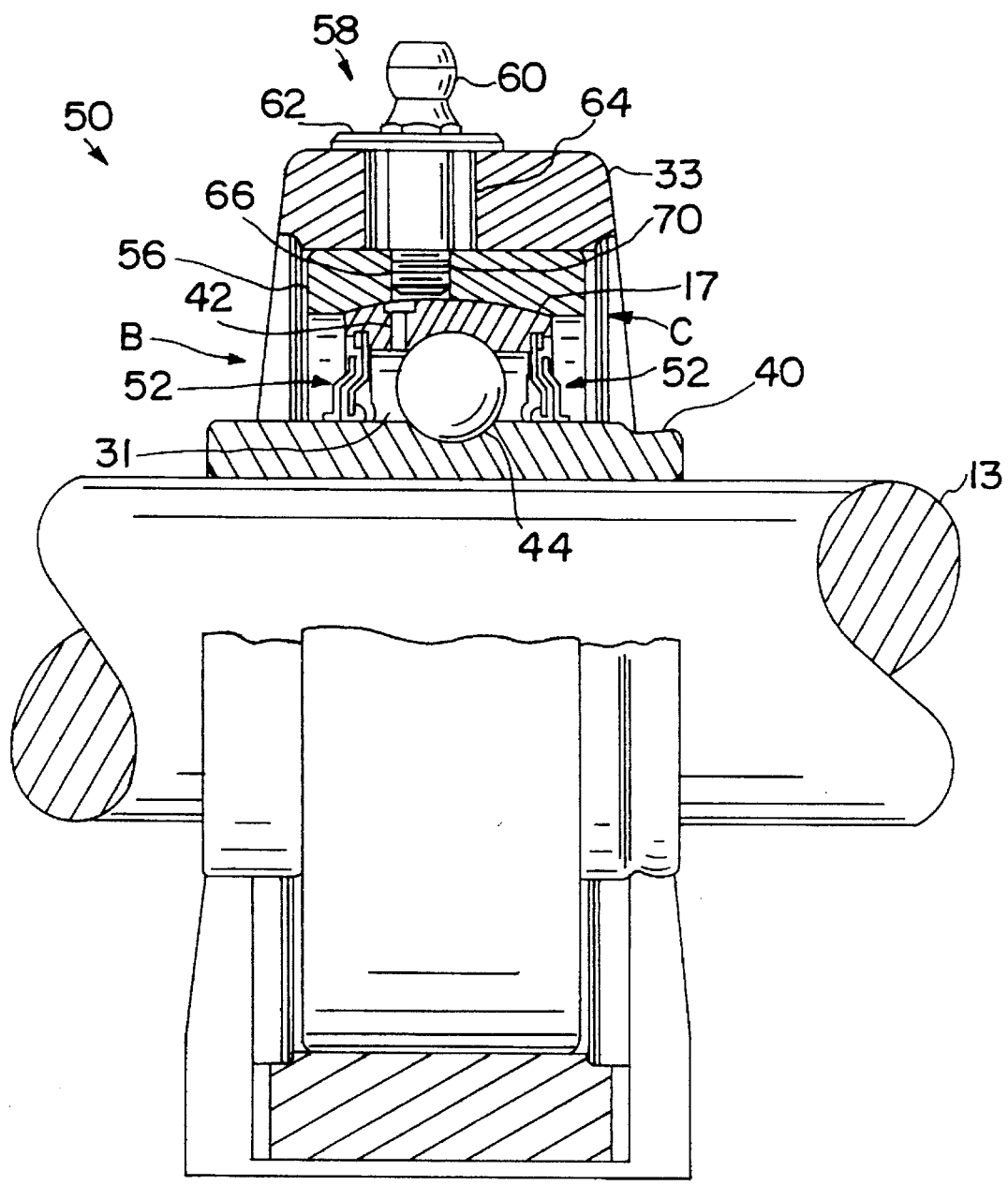
FIG. 2 is a partial cross-sectional view of an expansion bearing constructed in accordance with the present invention.

FIG. 2 illustrates a partial cross-sectional view of a preferred embodiment of a bearing assembly 50 constructed in accordance with the present invention. Assembly 50 includes a bearing group B comprising radially aligned inner ring 40, bearing elements 44 and an outer ring assembly indicated generally at C. Outer ring assembly C comprises an outer ring 17 and an aligning ring 56. Bearing group B also includes seal assemblies 52 axially bounding bearing chamber 31. Aligning ring 56 is disposed radially outward of outer ring 17 and between outer ring 17 and housing 33.

Fitting assembly 58, comprising fitting 60 and washer 62, conducts lubricant through second lubrication path 64 and into a first lubrication path comprising passageways 66 and 42 through aligning ring 56 and outer ring 17, respectively.

It should be understood that means other than fitting assembly 58 may achieve a seal for preventing leakage between the bearing group and the housing. For example, a seal may be compressed into the surface of housing 34 opposite aligning ring 56 and radially outward from passageway 64.

Figure 3:
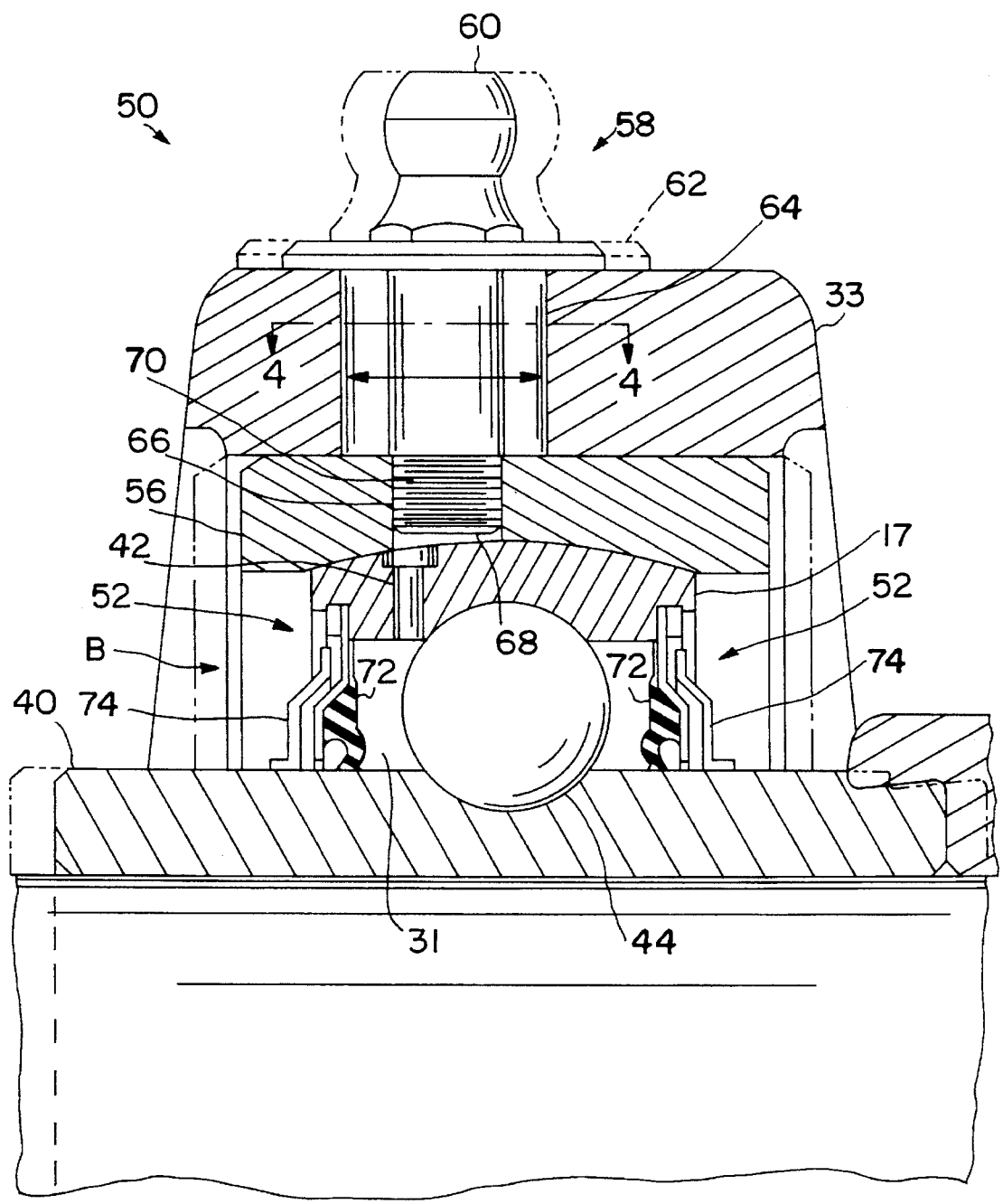
FIG. 3 is an enlarged view of a portion of the bearing of FIG. 2 illustrating the improved lubricant arrangement.

Referring now to the enlarged view presented in FIG. 3, fitting 60 has a threaded lower end 68 that threadably engages a threaded passageway 66 defined in aligning ring 56. Such engagement forms a mechanical seal 70 which prevents escape of lubricant conducted through fitting 60 into passageway 66. Thus, lubricant leakage between aligning ring 56 and housing 33 is largely eliminated.

It will be understood by those of ordinary skill in the art that the fit between aligning ring 56 and outer ring 17 is typically a microscopic interference fit. Because lubricants such as grease follow the path of least resistance, leakage through the microscopic interference fit is unlikely. Thus, lubricant conducted through fitting 60 generally follows a one-way path to bearing chamber 31 through threaded passageway 66 and passageway 42. When enough lubricant enters bearing chamber 31 to produce sufficient pressure on seal assemblies 52, lubricant may escape bearing chamber 31 via a lubrication exit path defined by seal assemblies 52. It should be understood that seal assemblies 52 are referred to as separate assemblies for ease of explanation only. They may be considered as one assembly as well and may have various configurations. For example, an equivalent seal assembly may define a lubrication exit path on only one side of bearing group B.

Such seal assemblies here comprise land riding seal 72 and flinger seal 74. Land riding seal 72 is secured to outer ring 17, permitting a relatively loose fit between land riding seal 72 and inner ring 14. On the other hand, flinger seal 74 is secured to inner ring 14. Thus, lubricant under sufficient pressure follows the lubrication exit path between land riding seal 72 and inner ring 14 and between land riding seal 72 and flinger seal 74. Any contaminant in or entering into bearing chamber 31 therefore tends to be flushed therefrom through the lubrication exit path. Additionally, the rotating motion of flinger seal 74 tends to prevent such contaminants from entering the lubrication exit path in the reverse direction.

FIG. 2 illustrates bearing assembly 50 installed on a shaft 13. It should be understood by those of ordinary skill in the art that various types of expansion bearings may be employed utilizing the construction of the present invention. For example, a pillow block type expansion bearing may be constructed without an aligning ring. In such a construction, the outer ring may have a cylindrical outer surface to permit axial movement with respect to the housing and thus would have less tolerance for angular shaft misalignment. To prevent lubricant leakage from between the housing and the outer ring, the fitting in such an embodiment would preferably extend through the second lubrication path defined in the housing and thread directly into the outer ring.

Additionally, a construction according to the present invention may be utilized with non-expansion bearings. In a pillow block configuration, a non-expansion bearing would typically not have an aligning ring. Often, a microscopic interference fit exists between the housing and the outer ring because the bearing group of such a bearing assembly would not move with respect to the housing. An alternative construction, however, may utilize a relatively greater clearance between the housing and the outer ring for ease of construction. In this alternative construction, a fitting according to the present invention may be threaded into the outer ring. Such a construction will both prevent leakage through the relatively larger clearance and secure the outer ring against axial or angular movement with respect to the housing.

Figure 4:
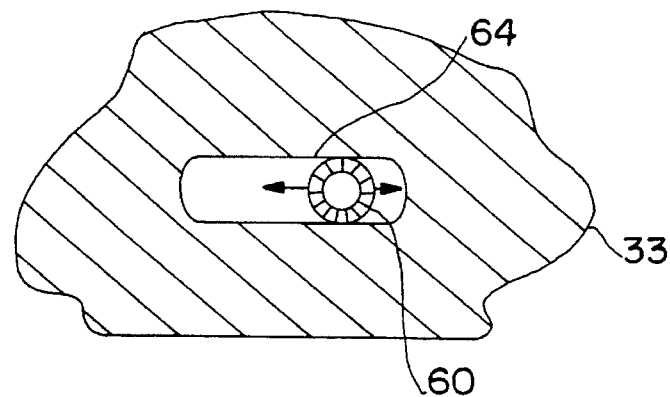
FIG. 4 is a cross-sectional view of a second lubrication path constructed in accordance with the present invention having a lubricant fitting extending therethrough.

Referring to FIG. 4, second lubrication path 64 comprises a slot having an axial width greater than the width of fitting 60 to permit axial movement of bearing group B and fitting assembly 58 as described above with respect to housing 33. The transverse width of slot 64 approximates the width of fitting 60 as it passes therethrough, thereby preventing rotational movement of fitting 60 and, consequently, aligning ring 56 with respect to housing 33.

Figure 5:
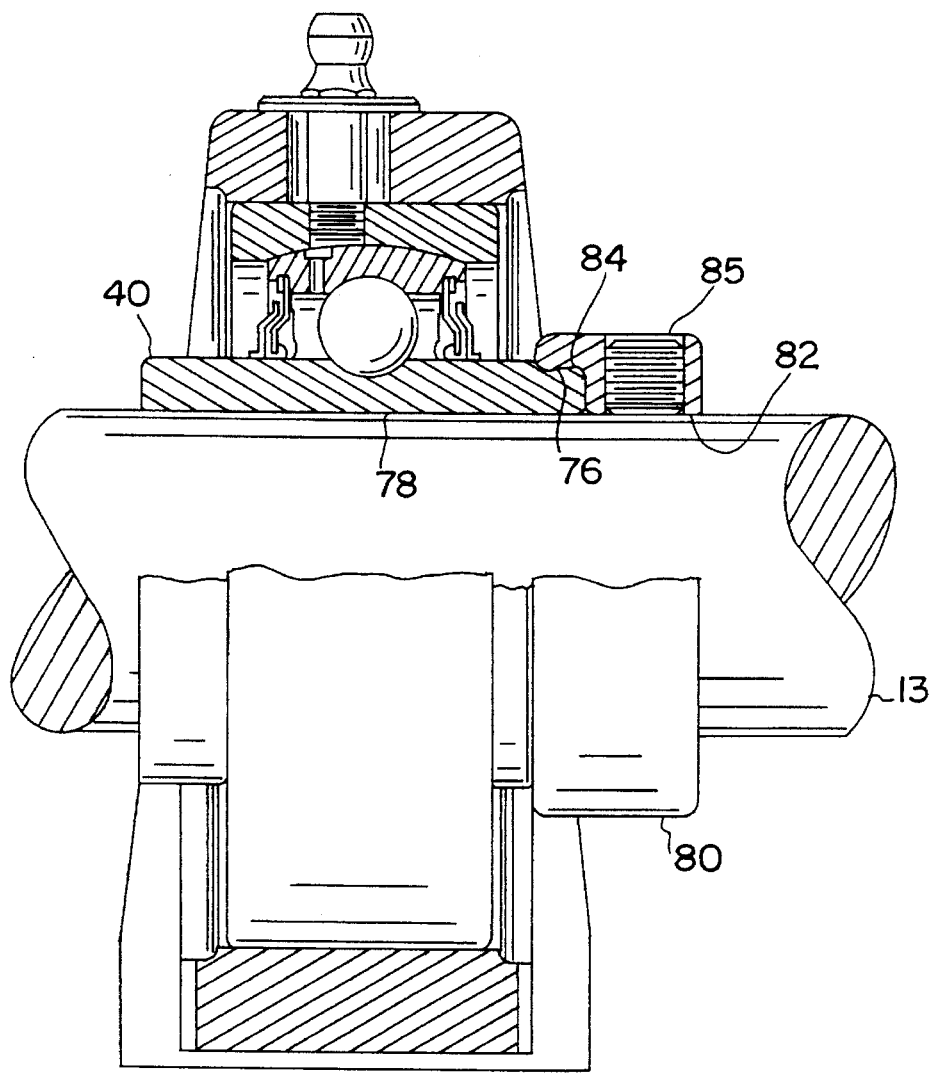
FIG. 5 is a partial cross-sectional view of an expansion bearing constructed in accordance with the present invention having an eccentric locking collar for effecting securement to a shaft.

It should also be understood by those of ordinary skill in the art that expansion bearing assemblies may be used in conjunction with various techniques and devices for clamping shaft 13 in position with respect to the bearing assembly. For example, referring to FIG. 5, inner ring 40 defines on one end an outer circumferential groove 76 eccentric with respect to inner ring bore 78. That is, groove 76 and inner bore 78 define slightly non-concentric circles. Clamping collar 80 defines a bore 82 for receiving shaft 13 and an inner circumferential groove 84 mateable with outer circumferential groove 76 such that collar 80 is mountable upon inner ring 40. Inner groove 84 is eccentric with respect to clamping collar bore 82 in such a relationship to the eccentricity between outer groove 76 and bore 78 that clamping collar 80 may be rotated with respect to inner ring 40 to bring bores 82 and 78 into clamping engagement with shaft 13. A tightening screw 83 is threadably received in a hole 85 defined in clamping collar 80. Screw 83 thus engages shaft 13 to secure the clamping positions of clamping positions of clamping collar 80 and inner ring 40.

Figure 6:
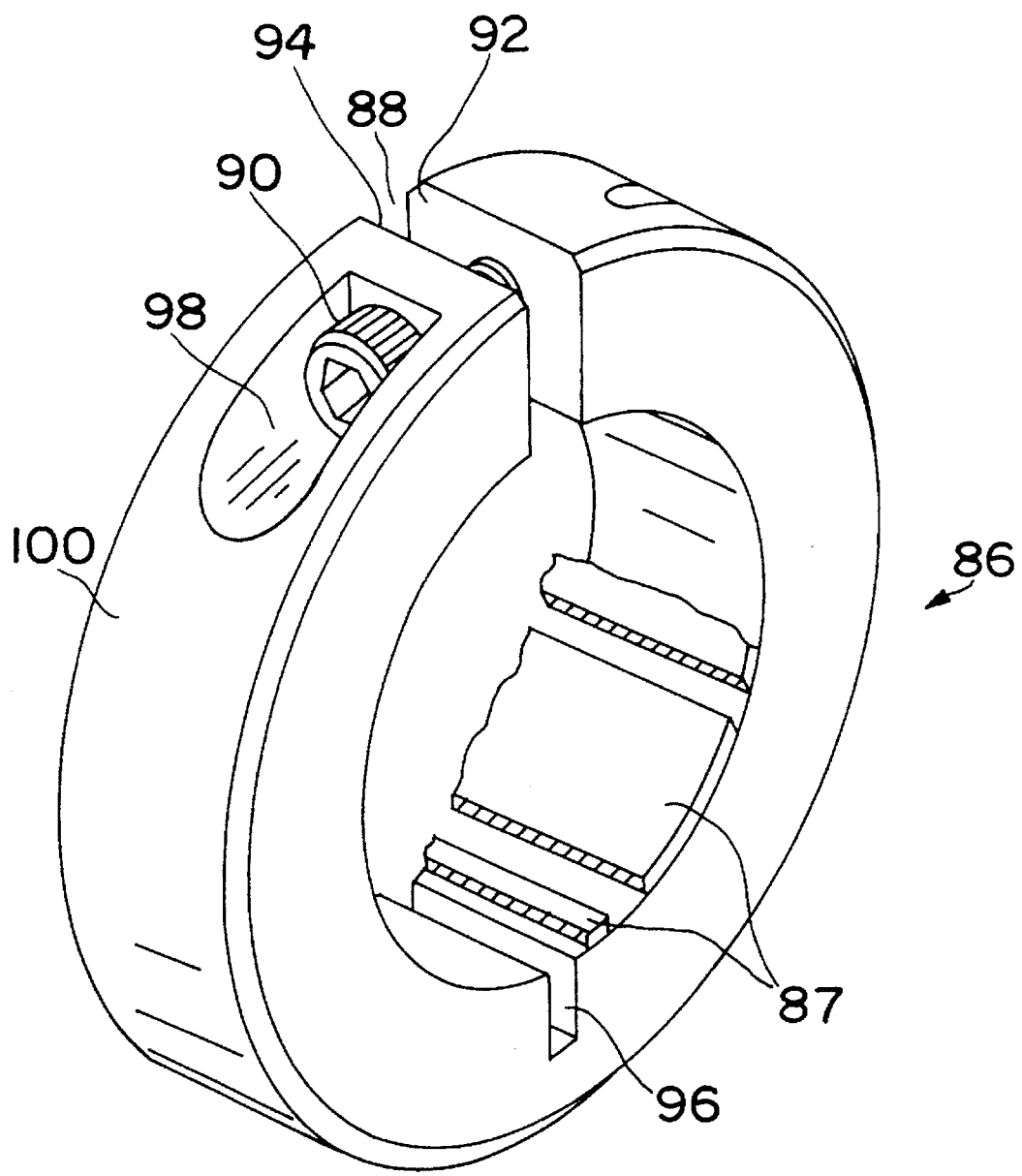
FIG. 6 is a perspective view of a clamping collar which may be utilized with the present invention.

Another clamping collar design is disclosed in U.S. patent application Ser. No. 08/120,584, filed Sept. 13, 1993, for "Bearing Assembly Utilizing Improved Clamping Collar," the specification of which is fully incorporated by reference herein. As shown in FIG. 6, this arrangement utilizes a clamping collar 86 situated about a plurality of clamping fingers 87 formed in an extension portion of the inner ring which may be used to secure a bearing assembly to a shaft 13 (FIG. 3). Clamping collar 86, having a circumferential gap 88, is mounted about the clamping fingers. When tightened by screw 90, opposed gap faces 92 and 94 of gap 88 are drawn closer together, thus forcing the clamping fingers into clamping engagement with shaft 13. Clamping collar 86 includes a radial slot 96 angularly offset from circumferential gap 88. A recess 98 is provided to harbor the head of screw, or tightening mechanism, 90 such that it does not protrude from outer surface 100 of collar 86.

Figure 7:
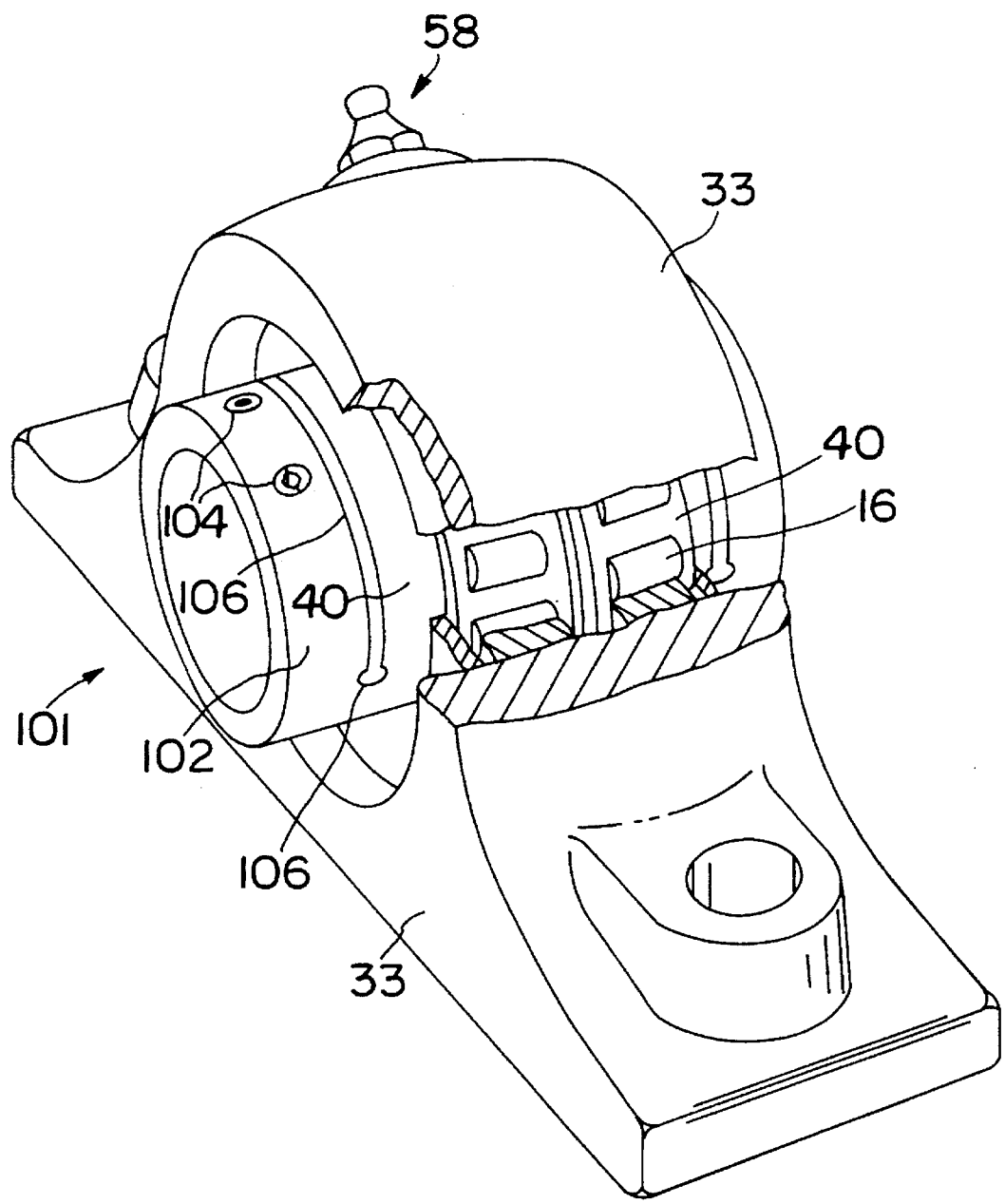
FIG. 7 is a perspective view of a pillow block bearing having an inner ring with a clamping end which may be utilized with the present invention.

FIG. 7 illustrates another clamping configuration that may be utilized within bearing assembly 50 (FIG. 3). A pillow-block bearing 101 has an inner ring 40 including an axial extension or end portion 102 which projects beyond housing 33 on one end, or on both ends, as shown here. The extension is provided with a plurality of threaded holes for receiving tightening screws 104. Preferably, tightening screws 104 comprise at least two set screws disposed radially and within an arc of less than 180 degrees. Throughcut slot 106 provided in the wall of extension 102 is configured to absorb the force applied to the extension. Locking contact between a shaft 13 (FIG. 4) and extended end portion 102 is established between the screws. Such a configuration is more fully disclosed in U.S. Pat. No. 4,687,351 owned by the assignee of the present invention and fully incorporated by reference herein.

Those of ordinary skill in the art should understand that various equivalent constructions are possible within the scope and spirit of the present invention. Thus, bearing assemblies having many configurations and clamping designs may be achieved. Any and all equivalent bearing assemblies utilizing the lubrication device of the present invention are understood to be within the scope of the invention.

Furthermore, while ball bearings have been illustrated, it should be appreciated by one skilled in the art that the particular type of bearing element utilized is not critical to the present invention, and any suitable type of bearing element may be utilized. These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A bearing assembly, said bearing assembly comprising:
    (a) a bearing group, said bearing group including an inner ring defining a bore for receiving a shaft therein and including a first annular raceway surface, an outer ring assembly aligned radially outward of said inner ring and defining a second annular raceway surface opposite to said inner raceway surface, said inner ring and outer ring assembly defining a bearing chamber, and said outer ring assembly defining a first passageway for permitting ingress of lubricant into said bearing chamber, and at least one bearing element disposed within said bearing chamber and configured to permit the rotational displacement of said inner ring and said outer ring assembly relative to one another;
    (b) a housing disposed about said bearing group, said housing defining a second passageway, said second passageway passing through said housing to said bearing group at said first passageway; and
    (c) a lubricant fitting assembly comprising a fitting configured to conduct lubricant therethrough and to extend through said second passageway to said first passageway, said fitting connected to said outer ring assembly to permit the introduction of lubricant directly to said first passageway from said fitting.

2. The bearing assembly as in claim 1, wherein said bearing group further comprises a seal assembly axially bounding said bearing chamber and defining a lubrication exit path such that lubricant within said bearing chamber is permitted to escape therefrom through said lubrication exit path.

3. The bearing assembly as in claim 1, wherein said outer ring assembly comprises an aligning ring and an outer ring, said aligning ring aligned radially within said housing to permit said aligning ring to slide axially with respect thereto, aligned radially outward of said outer ring, and configured to positionally secure said outer ring.

4. The bearing assembly as in claim 1, wherein said second passageway is configured to permit axial movement of said lubricant fitting assembly with respect to said housing and to prevent rotational movement of said lubricant fitting assembly with respect to said housing.

5. The bearing assembly as in claim 1, wherein said lubricant fitting assembly further comprises a washer in communication with said fitting and an external surface of said housing.

6. The bearing assembly as in claim 1, wherein said second passageway comprises a slot having an axial width greater than the width of said fitting so that said fitting may axially slide within said slot.

7. The bearing assembly as in claim 6, wherein said slot defines a transverse width approximating the width of said fitting to prevent rotational movement of said aligning ring with respect to said housing.

8. The bearing assembly as in claim 1, wherein said first passageway includes a threaded portion and said fitting includes a threaded portion for threadably engaging said first passageway.

9. The bearing assembly as in claim 8, wherein said outer ring assembly comprises an aligning ring and an outer ring, said aligning ring aligned radially within said housing to permit said aligning ring to slide axially with respect thereto, aligned radially outward of said outer ring, configured to positionally secure said outer ring, and defining said threaded portion of said first passageway.

10. The bearing assembly as in claim 9, wherein said second passageway comprises a slot having an axial width greater than the width of said fitting so that said fitting may axially slide within said slot and a transverse width approximating the width of said fitting to prevent rotational movement of said aligning ring with respect to said housing.

11. The bearing assembly as in claim 10,
    wherein said inner ring includes an axially extending clamping portion defining a plurality of circumferentially spaced axial slots forming clamping fingers, and
    wherein said bearing assembly further comprises
        a clamping collar mountable about said clamping fingers, said clamping collar defining a circumferential gap therein having opposed gap faces, and
        a tightening mechanism configured to draw said opposed gap faces closer together to forcibly push said clamping fingers into clamping engagement with the shaft.

12. The bearing assembly as in claim 10, wherein said inner ring includes an axially extending clamping portion having at least one tightening screw threaded radially therethrough for contacting the shaft such that said at least one tightening screw may be selectively positioned into clamping engagement with the shaft.

13. The bearing assembly as in claim 10,
    wherein said inner ring includes an axially extending end portion defining an outer circumferential groove eccentric with respect to said inner ring bore, and
    wherein said bearing assembly further comprises
        a clamping collar defining a bore for receiving a shaft therein and an inner circumferential groove, mateable with said outer circumferential groove of said inner ring, for mounting said clamping collar thereon,
        said inner circumferential groove being eccentric with respect to said clamping collar bore, and
    wherein said end portion and said clamping collar are configured such that when said clamping collar is rotated to a predetermined position with respect to said end portion, said clamping collar and said end portion are brought into clamping engagement with the shaft, and at least one tightening screw threaded radially through said clamping collar such that said at least one tightening screw may be selectively positioned into clamping engagement with the shaft.

14. A bearing assembly, said bearing assembly comprising:

(a) a bearing group, including an inner ring defining a first annular raceway surface, an outer ring assembly defining a second annular raceway surface, said inner ring and outer ring assembly being situated opposite to each other and defining a bearing chamber, and said outer ring assembly defining a first lubrication path to said bearing chamber;

(b) at least one bearing element disposed within said bearing chamber and configured to permit rotational displacement of said inner ring and said outer ring assembly relative to one another;

(c) a housing disposed about said bearing group, said housing defining a second lubrication path therethrough to said outer ring assembly at said first lubrication path; and (d) a seal in operative communication with said first lubrication path and configured to impede lubricant passage through said seal and between said housing and said bearing group.

15. The bearing assembly as in claim 14, further comprising:

a lubricant fitting assembly comprising a fitting configured to conduct lubricant therethrough and to extend through said second lubrication path to said first lubrication path, said fitting connected to said outer ring assembly to permit the introduction of lubricant directly to said first lubrication path.

16. The bearing assembly as in claim 15, wherein said lubricant fitting assembly extends into said first lubrication path to form said seal with said bearing group.

17. The bearing assembly as in claim 16, wherein said first lubrication path includes a threaded passageway and said fitting includes a threaded portion for threadably engaging said threaded passageway.

18. The bearing assembly as in claim 15, wherein said lubricant fitting assembly further comprises a washer in communication with said fitting and an external surface of said housing.

19. The bearing assembly as in claim 14, wherein said inner ring, said outer ring assembly and said housing are radially aligned and wherein said inner ring defines a bore for receiving a shaft therein.

20. The bearing assembly as in claim 19, wherein said bearing elements comprise ball bearing elements.

21. The bearing assembly as in claim 19, wherein a portion of said bearing group defines a lubrication exit path in communication with said bearing chamber such that lubricant within said bearing chamber is permitted to escape therefrom through said lubrication exit path.

22. The bearing assembly as in claim 21, wherein said bearing group further comprises a seal assembly axially bounding said bearing chamber, said seal assembly defining said lubrication exit path.

23. The bearing assembly as in claim 19, wherein said bearing group further comprises a seal assembly axially bounding said bearing chamber.

24. The bearing assembly as in claim 19, further comprising a lubricant fitting assembly comprising a fitting configured to conduct lubricant therethrough and to extend through said second lubrication path to said first lubrication path, said fitting connected to said outer ring assembly to permit the introduction of lubricant directly to said first lubrication path, and wherein said second lubrication path is configured to permit axial movement of said lubricant fitting assembly with respect to said housing.

25. The bearing assembly as in claim 24, wherein said second lubrication path is configured to prevent rotational movement of said lubricant fitting assembly with respect to said housing.

26. The bearing assembly as in claim 24, wherein said lubricant fitting assembly further comprises a washer, said washer in communication with said fitting and an external surface of said housing, and said second lubrication path comprises a slot having an axial width greater than the width of said fitting so that said fitting assembly may axially slide within said slot.

27. The bearing assembly as in claim 26, wherein said slot has a transverse width approximating the width of said fitting.

28. The bearing assembly as in claim 19, wherein said outer ring assembly comprises an aligning ring and an outer ring, said aligning ring aligned radially within said housing to permit said aligning ring to slide axially with respect thereto, aligned radially outward of said outer ring, and configured to positionally secure said outer ring.

29. The bearing assembly as in claim 28, wherein said first lubrication path through said aligning ring includes a threaded passageway and said fitting includes a threaded portion for threadably engaging said threaded passageway.

* * * * *